United States Patent Office 3,228,669
Patented Jan. 11, 1966

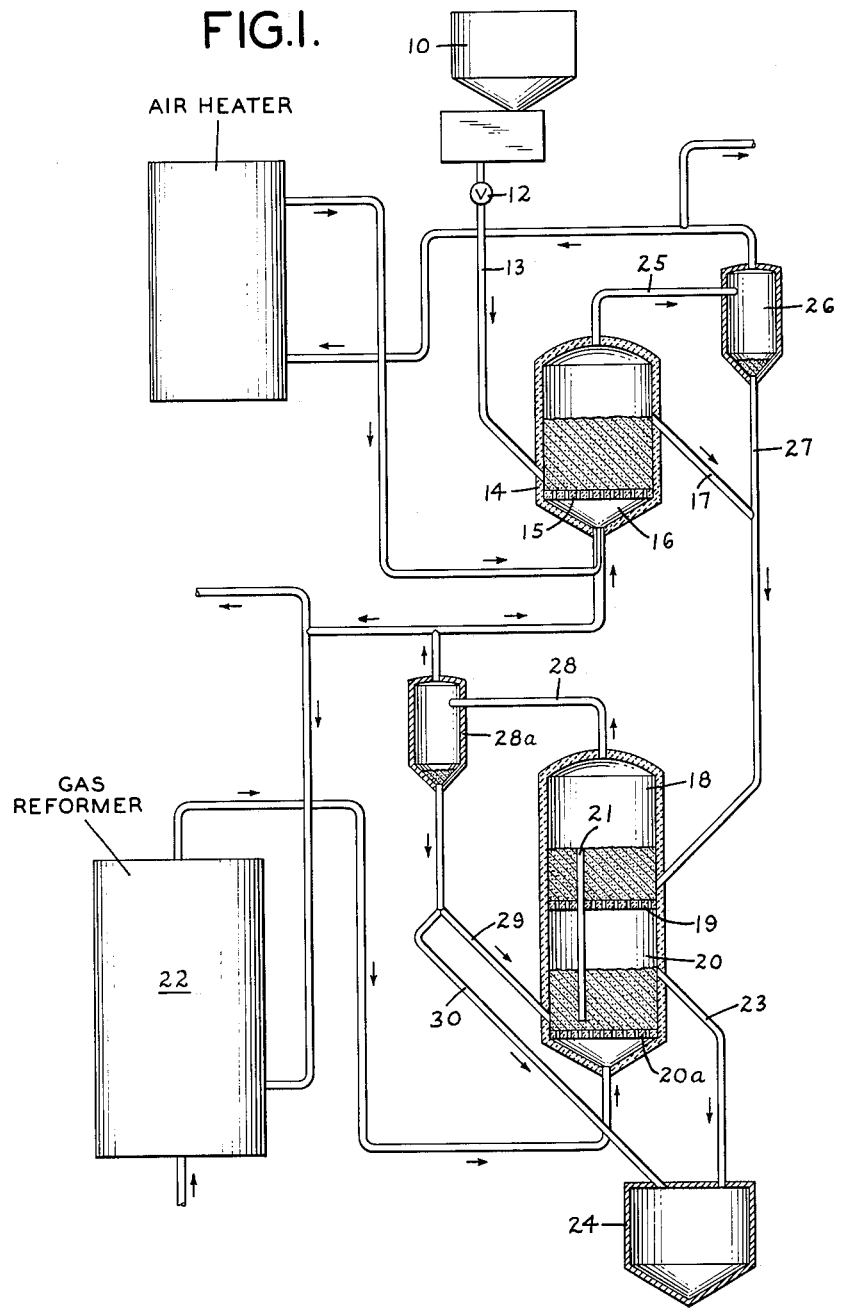
FIG.I.

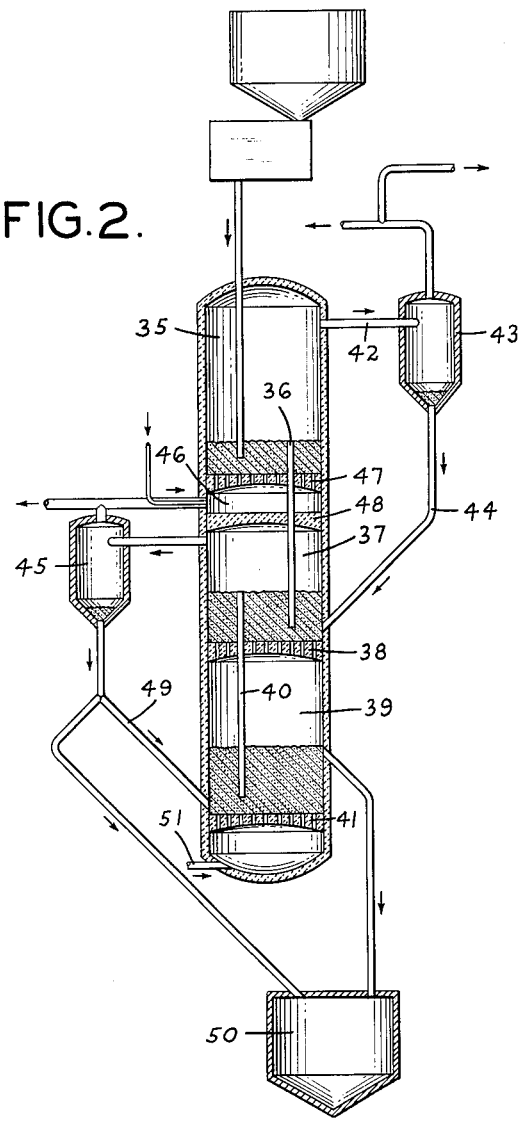

3,228,669
SYSTEM FOR BENEFICIATION OF ORES
Bruce S. Old, Concord, Richard W. Hyde, Lexington, and Frank C. Schora, Jr., Bedford, Mass., assignors to Arthur D. Little, Inc., Cambridge, Mass., a corporation of Massachusetts
Filed Aug. 2, 1962, Ser. No. 214,274
3 Claims. (Cl. 266—9)

This invention relates to the benefication of ores and more particularly to improvements in systems for refining iron ores by direct fluid bed reduction.

As disclosed in the Old et al. U.S. Patent No. 3,020,149, finely divided iron ores and the like are reduced to a highly metallized state by passing the ore, while fluidized by means of suitably heated reducing gases, successively through a preheating and prereducing chamber and through several reaction chambers wherein the temperature and rate of flow of a reducing gas therein are maintained at such levels that sticking and agglomerating of the particles is avoided. A further feature of the Old et al. system and method is the provision of separators to which the off-gases from each of the preheating and reaction chambers are passed to separate therefrom finely divided particles (dust) and divert these particles in each instance to a chamber where the particles are in a more advanced state of reduction. Methods and systems of the type described are highly satisfactory for the reduction of finely divided iron ores, even those ores in which the size of the particles varies greatly.

It has now been discovered, as described in an article in the "Transactions of the Metallurgical Society of AIME, volume 221, No. 6, pp. 1221–1225, December 1961, that the reduction time for ores having particle sizes of 1 to 3 mm. is independent of particle size. This discovery led us to the conclusion that systems of the type disclosed in the Old et al. Patent No. 3,020,149 can be simplified to enable the use of less expensive and less complex equipment for refining iron ore and the like.

In accordance with the present invention, systems are provided in which fines carried over by the spent or partially spent reducing gases from each of the preheating and reducing chambers of a direct fluidized bed reduction system can be bypassed around at least one of the reduction stages or chambers and by recirculating the fines in a direction counter to the flow of the larger particles can be reduced to a highly metallized state.

In a typical apparatus, the finely divided iron ore, for example, 1 to 3 mm. particle size, is preheated and prereduced and maintained in a fluidized state in a chamber which is heated by combustion of partially spent reducing gases, the combustion taking place either exterior of the prereducing and preheating chamber or within the chamber. The preheated and prereduced ore overflows into a first reducing chamber where the temperature is maintained at such a level that agglomeration and sticking of the ores is avoided. The ore in the first reducing chamber is also fluidized by gases flowing directly from a second reducing chamber through a suitable porous hearth or floor. Fresh hot reducing gas produced by a suitable gas generator or reforming system is supplied to the second reducing chamber to further reduce the ore and is discharged therefrom at a lower temperature.

Gases discharged from the preheater and prereducer are passed through a separator, such as the cyclone separator, to remove fines entrained in the gas and deliver them to the bottom of the first reducing chamber. The off-gas from the first reducing chamber likewise is passed through a separator where the finely divided particles are removed from the gas and in part are returned to the second reducing chamber and in part to a product bin which also receives the reduced particles discharged from the second reducing chamber. No disadvantage arises from recirculating the fines removed overhead from the first reducing chamber through the second reducing chamber and back into the first reducing chamber in a direction counter to the flow of the main body of the ore through the reducing chambers, and a simplified system can thereby be used. Moreover, the gases flowing directly from the second reducing chamber to the first reducing chamber have given up a part of their heat content so that their temperature upon entering the first reducing chamber is high enough for efficient reduction, e.g., between about 700 and 900°, but sufficiently low to avoid agglomerating of the particles in the first reducing chamber where they are about 40% or more metallized and thus not as susceptible to sticking and agglomeration.

For a better understanding of the present invention, reference may be had to the accompanying drawing, in which:

FIGURE 1 illustrates a system for beneficiating ores in accordance with the present invention; and FIGURE 2 is a schematic illustration of a modified system for practicing the invention.

Referring to FIGURE 1, a typical system includes a bin 10 from which ore is discharged through a metering valve 12 and a conduit 13 into the bottom of a preheating and prereducing chamber 14. Heated gas is introduced into chamber 14 through a porous floor or hearth from a combustion chamber 16 below the hearth 15 to fluidize, preheat and partially reduce the ore in the chamber 14. If desired, the combustion chamber may be disposed elsewhere than beneath the floor or all or part of the reducing gas can be burned in the ore in the chamber 14.

An overflow pipe 17 connects the chamber 14 to a first reaction chamber 18 and discharges the preheated ore adjacent to the porous floor or hearth 19 therein.

A second reducing chamber 20 is disposed below the chamber 18 and communicates with it through the porous floor 19.

An overflow pipe 21 extends upwardly into the chamber 18 and downwardly into the chamber 20 to a point adjacent the porous hearth or floor 20a therein.

Hot reducing gas produced in a gas reforming or gas generating unit 22 is supplied to the second reducing chamber 20 through the porous floor 20a thereof to fluidize the ore therein and further reduce it. An overflow pipe 23 discharges the reduced or metallized ore (80% to 90% metallized) into a receiving means, such as a storage bin 24.

In order to prevent loss of finely divided or dust-like particles, the gases issuing from the preheating chamber 14 are exhausted through a conduit 25 into a separator, such as the cyclone separator 26, from which the gas may be discharged to be burned for heating air or the like, for use as a supplementary fuel gas or for any other suitable purpose. Finely divided particles removed from the gas by the separator 26 are discharged downwardly through the conduit 27 and enter the first reaction chamber 18 near the bottom thereof for admixture with the preheated ore also being discharged through conduit 17. Gas issuing from the chamber 18 is discharged through a conduit 28 into a separator 28a and when freed of dust is supplied for combustion with air in the combustion chamber 16 for fluidizing, preheating and partially reducing the ore therein. The finely divided particles removed from the gas in the separator 28a are discharged downwardly through a conduit 29 and directed partly to the bottom of the reaction chamber 20 and partly through a branch conduit 30 to the product bin 24.

In this system, the finely divided or dust-like particles which are carried over or entrained with the gas flowing from the chamber 20 pass upwardly through or are mixed with the particles in the chamber 18 and may be carried over, at least in part, into the separator 28 or returned with larger particles to the chamber 20. At least a part of the fines flow generally counter to the main body of ore passing through the chambers but are ultimately discharged into the product bin after a sufficient residence time in the reaction chambers to assure their reduction to metal or to a substantially completely metallized state.

The form of the invention shown in FIGURE 2 differs somewhat from that described above. It includes a pre-reducing chamber 35 which is supplied with finely divided ore particles and has an overflow pipe 36 for delivering the preheated solid ore particles into a first reaction chamber 37 near the porous hearth 38 therein which separates it from a second reaction chamber 39. Partially reduced ore in the chamber 37 overflows through an overflow pipe 40 and is discharged adjacent to the porous floor or hearth 41 of the lower reaction chamber 39. Gas from the preheating chamber 35 and the dust entrained therein are discharged through a conduit 42 into a separator 43 and the separated dust is supplied through a conduit 44 to the bottom of the first reducing chamber 37. Gas from the chamber 37 enters a separator 45, the gas being burned with air in a combustion chamber 46 below the porous floor 47 of the prereducing chamber. A non-porous partition 48 forms the bottom of the combustion chamber 46 and the top of the first reducing chamber 37.

Dust or fine particles separated from the gas in the separator 45 are returned in part through conduit 49 to the bottom of the second reducing chamber 39 and in part are discharged to a product storage bin 50.

Fresh hot reducing gas is supplied to the lowermost or second reducing chamber 39 by means of a conduit 51.

In this system the fines also follow a loop path upwardly through the first and second reducing chambers rather than a short-circuited path.

The apparatus may be further modified, if desired, by directing the fines from the preheating-prereducing chamber directly to the second reaction chamber 20 or 39. By this mode of operation, any fines which may short circuit, that is, may be discharged from the first reaction zone and separator to the product bin without first making one or more loops through the system, will nevertheless be in the reaction system long enough to be substantially completely metallized before being discharged.

By positioning the separator fines inlet and the coarse overflow outlet on opposite sides of the reaction chambers 20 or 39, short-circuiting of fines between the fines inlet and the coarse discharge will be minimized, especially with larger diameter reactors. This is especially so for the reason that in fluid bed operation, solids transfer or mixing in a horizontal direction is relatively poor.

In typical operations, the raw reducing gas entering the lower reaction chamber has a relatively high temperature, for example, between about 900° and 1100° C. When the ore particles undergoing reaction are 10 mm. or smaller, a gas flow rate of about five feet per second has been found satisfactory to fluidize the ore. In practice, when the gases are produced by reforming of methane, about 11,000 to 15,000 cubic feet of methane is adequate per ton of ore. A typical gas contains about 21% CO, 0.4% $CO_2$, 49.1% hydrogen and 1.7% water, the balance being essentially nitrogen. By supplying gas at, for example, 900° C., the temperature of the gas entering the first reaction chamber from the second reaction chamber is reduced to a usable figure of about 700° C. which is low enough to avoid sticking and agglomerating of the partially reduced ore, but high enough for efficient partial reduction of the ore to the range of about 40% to 50% metallization.

From the foregoing description of typical systems embodying the present invention, it will be apparent that a simplified, efficient and effective system of beneficiating ore has been provided. It will be understood the embodiments of the invention described therein are illustrative and the invention should be considered as limited only as defined in the following claims.

We claim:
1. A system for beneficiating ores comprising a preheating chamber, means for supplying finely divided ore particles to said preheating chamber, a first reaction chamber below said preheating chamber, a second reaction chamber below said first reaction chamber, receiving overflow means for beneficiated ores, each of said preheating and said reaction chambers having a porous hearth, means connecting said preheating chamber, said first reaction chamber and said second reaction chamber in series for flow of said particles therethrough, overflow discharge means connecting said second reaction chamber to said receiving means, means for introducing a heated reducing gas into said second reaction chamber from below for fluidizing and reducing the particles therein, the porous hearth of said first reaction chamber being between said first and second reaction chambers for flow of gas and finely divided particles entrained in said gas from said second reaction chamber into said first reaction chamber from below to fluidize and reduce the particles therein, first connecting means for flow of gas from said first reaction chamber to said preheating chamber to heat and fluidize said particles in said preheating chamber, first separating means in said first connecting means for separating finely divided particles from said gas, means connecting said first separating means to said second reaction chamber and said receiving means for supplying part of said separated particles to said second reaction chamber adjacent to the hearth thereof and part of said separated particles to said receiving means, means for discharging gas from said preheating chamber, second separating means connected to said discharge means for separating finely divided particles from said gas and collecting said particles, and means connecting said second separating means to one of said first and second reaction chambers adjacent to the porous hearth thereof for supplying said collected particles to said one of said reaction chambers.

2. The system set forth in claim 1 in which said means for supplying said collected particles from said second separating means to said one of said reaction chambers is connected to said first reaction chamber.

3. The system set forth in claim 2 in which said means for supplying said collected particles from said second separating means to said one of said reaction chambers is connected to said second reaction chamber.

References Cited by the Examiner
UNITED STATES PATENTS

| | | | |
|---|---|---|---|
| 2,671,721 | 3/1954 | Gilliland | 48—196 X |
| 2,965,449 | 12/1960 | Jukkola | 23—284 X |
| 2,990,269 | 6/1961 | Hyde | 75—26 |
| 3,020,149 | 2/1962 | Old et al. | 75—26 |

JOHN F. CAMPBELL, *Primary Examiner.*

MORRIS O. WOLK, *Examiner.*